United States Patent [19]

Saito

[11] Patent Number: 4,730,342

[45] Date of Patent: Mar. 8, 1988

[54] EQUALIZER CIRCUIT FOR USE IN COMMUNICATION UNIT

[75] Inventor: Kazuo Saito, Amagasaki, Japan

[73] Assignee: Mitsubishi Denki Kabushiki Kaisha, Tokyo, Japan

[21] Appl. No.: 580,729

[22] Filed: Feb. 16, 1984

[30] Foreign Application Priority Data

Feb. 25, 1983 [JP] Japan .................................. 58-31223
Jun. 14, 1983 [JP] Japan ................................ 58-108179
Jun. 14, 1983 [JP] Japan ................................ 58-108180

[51] Int. Cl.⁴ ............................................ H03H 11/06
[52] U.S. Cl. .................................... 375/12; 333/18; 364/724
[58] Field of Search ............... 333/18, 28 R, 100, 136; 375/11, 101, 12; 364/724; 455/304, 305

[56] References Cited

U.S. PATENT DOCUMENTS

| 2,805,398 | 9/1957 | Albershein | 375/11 |
|---|---|---|---|
| 3,781,722 | 12/1973 | Pierson | 333/28 R |
| 3,883,830 | 5/1975 | Hekimian | 333/28 R |
| 3,997,841 | 12/1976 | Borowski | 333/28 R |
| 4,333,063 | 6/1982 | Ryu et al. | 333/28 R |
| 4,477,913 | 10/1984 | Koya et al. | 333/28 R |
| 4,491,808 | 1/1985 | Saito | 333/28 R |

FOREIGN PATENT DOCUMENTS

| 0079204 | 5/1983 | European Pat. Off. . | |
|---|---|---|---|
| 2059728 | 3/1973 | Fed. Rep. of Germany . | |
| 2300612 | 9/1973 | Fed. Rep. of Germany . | |
| 2513700 | 4/1982 | Fed. Rep. of Germany . | |
| 3210079 | 10/1982 | Fed. Rep. of Germany . | |
| 2642428 | 12/1982 | Fed. Rep. of Germany . | |
| 3124328 | 1/1983 | Fed. Rep. of Germany . | |
| 3110919 | 7/1983 | Fed. Rep. of Germany . | |
| 3202727 | 8/1983 | Fed. Rep. of Germany . | |
| 0012419 | 1/1983 | Japan | 375/11 |

Primary Examiner—Robert L. Griffin
Assistant Examiner—Stephen Chin
Attorney, Agent, or Firm—Lowe, Price, LeBlanc, Becker & Shur

[57] ABSTRACT

A variable group delay equalizer comprises a delay portion and an amplitude correcting portion. In the delay portion, a group delay frequency response of an input signal is controlled. In the amplitude correcting portion, an amplitude distortion of the input signal caused in a delay portion can be corrected. A variable group delay equalizer with a wider variable range can be obtained by combining a fixed group delay equalizer.

25 Claims, 26 Drawing Figures

EQUALIZER CIRCUIT FOR USE IN COMMUNICATION UNIT

BACKGROUND OF THE INVENTION

1. Field of the Invention

The present invention relates to an equalizer circuit for use in a communication unit. More particularly, the present invention relates to an equalizer circuit utilizing a transversal filter theory.

2. Description of the Prior Art

FIG. 1 is a conceptual drawing showing an example of a time division multiple access (TDMA) communication which is a background of the present invention. The TDMA communication is used for a satellite communication, for example, which comprises a plurality of earth stations ES, ES' . . . and a common communication satellite CS. The earth station ES comprises a transmitting apparatus TRA and a receiving apparatus REA. A signal modulated by a modulator MOD included in the transmitting apparatus TRA is sent from an antenna AE through an equalizer EQL and a transmitter TR toward an antenna AS of the communication satellite CS. The signal is frequency converted and the frequency-converted signal is sent to other earth station ES'. Similarly, a signal from other earth station ES' is received by the antenna AE of the earth station ES through the communication satellite CS and the received signal is provided to the receiving apparatus REA. In the receiving apparatus REA, the received signal passes through a receiver RE and an equalizer EQL and is demodulated by a demodulator DEM. It is known that the transmitter TR and the receiver RE in the earth station ES and the receiving system and the transmitting system in the communication satellite cause an amplitude distortion and/or group delay distortion, respectively. Particularly, a high power amplifier (not shown) included in the communication satellite CS is used in a relatively saturated state due to size, price and stability thereof. As a result, an AM - PM conversion is caused in the high power amplifier, which causes a phase variation as shown in line A in FIG. 2 in which the line B denotes an output level. Such a phase variation becomes a group delay distortion.

The amplitude distortion and group delay distortion are, respectively, equalized for an amplitude frequency response and a group delay frequency response by the equalizer EQL included in the transmitting apparatus TRA and the equalizer EQL included in the receiving apparatus REA. Conventionally, such equalizer EQL is generally structured to include a fixed amplitude equalizer FAE, a fixed group delay equalizer FDE and a variable equalizer ME, as shown in FIG. 3. Either of the fixed amplitude equalizer FAE and a fixed group delay equalizer FDE or both of them may be omitted depending on the amount of the actual amplitude distortion or group delay distortion.

In the TDMA communication system which is the background of the present invention, it is impossible that once an operation is initiated, the above described amplitude frequency response and the group delay frequency response are detected by transmitting and receiving test signals so that an optimum amount of equalization is detected. The reason is that the time period when a single earth station occupies a line is extremely short since such communication system is made in a time divisional manner. Therefore, in case where a new earth station joins such a communication satellite system, it is necessary to seek an optimum point where an amplitude distortion and a group delay distortion are minimum and thus a bit error rate (BER) is minimum. To this end, a variable equalizer ME as shown in FIG. 3 may be used.

FIG. 4 is a circuit diagram showing an example of a conventional variable equalizer. An input signal inputted to an input terminal 1 branches through a branch circuit 2, a portion of which is applied to an attenuation setting circuit 4 having coefficient $-a_3$ and the remaining signal being inputted to the next branch circuit 2 through a delay line 3 having a delay amount T. In a similar operation, the respective signals are applied to the respective attenuation setting circuits having respective attenuation amounts. The signals from the attenuation setting circuits 4, 4, . . . all are applied to an adder 5 and thus the synthesized signals are outputted from the adder 5 to an output terminal 6. The attenuation setting circuits 4, 4, . . . include polarity reverse. In such a way, the attenuation amounts of the attenuation setting circuits 4, 4, . . . are set to $a_0 = 1$ at the center, $+a_1$ and $-a_1$ on both sides thereof, which absolute values are equal but the polarities thereof are opposite to each other, $+a_2$ and $-a_2$, . . . , $+a_n$ and $-a_n$. In such a manner, an amplitude frequency response and a group delay frequency response are set through a known transversal filter theory by arbitrarily setting the respective attenuation amounts of the attenuation setting circuits 4, 4, . . . . More particularly, an optimum point is sought by the variable equalizer ME by varying an amplitude frequency response and group delay frequency response while detecting a bit error rate (BER).

In the TDMA communication system, the bit error rate is more greatly affected by a group delay distortion rather than an amplitude distortion and thus an operation for seeking such an optimum point is easily made if an optimum equalization amount for the group delay distortion can be set. Nevertheless, a conventional variable equalizer has not been able to vary, for example, only an amplitude or only group delay since the attenuation amounts of the attenuation setting circuits 4, 4, . . . are arbitrarily set. Accordingly, this means that it is difficult to seek an optimum point by a conventional variable equalizer in a TDMA communication system in which the influence of the group delay frequency response is greater than that of the amplitude frequency response. In addition, although attenuation amounts of a conventional variable equalizer determine an amplitude frequency response and the group delay frequency response, respectively, how such frequency response characteristics vary when a signal attenuation amount varies could not be known without a large number of simulation data since such variation is different depending on other coefficients. For this reason, it can not be easily confirmed how the amplitude and group delay are equalized.

Another variable equalizer as shown in FIG. 5 has been already proposed by the present applicant, for example. In FIG. 5, an input signal applied from an input terminal is distributed by a distributor 7. The signal distributor 7 distributes a signal into three signals of the same level. A delay line 3 having a delay amount T is interposed in one path for one signal of three signals, a delay line 31 having a delay amount 2T is interposed in another path, and a polarity inverter 8 is interposed in the remaining path. The polarity inverter 8 is structured by a known transformer or transistor and the like and shifts a phase of an applied signal by 180°. The signal from delay line 31 and the signal from the polarity inverter 8 are synthesized by an adder 9 to be applied to a variable attenuation setting circuit 10. The variable attenuation setting circuit 10 comprises a polarity reverse and an output signal therefrom is synthesized with an output signal from the delay line 3 by an adder 11.

Let it be assumed that no attenuation of signal is caused except for the variable attenuation setting circuit 10 and that no time delay is caused except for the delay lines 3 and 31 and the delay of a main signal is used as a reference (zero). Then, an output signal $B(\omega)$ obtained from an output terminal 6 is represented in the following equation (1).

$$B(\omega) = \cos\omega t - l\cos\omega(t + T) + l\cos\omega(t - T) \quad (1)$$
$$= \sqrt{(1 + 2l^2) - 2l^2\cos 2\omega T} \cdot \cos(\omega t + \theta)$$

wherein
$\theta = -\pi/2 + \tan^{-1}(\frac{1}{l}/\sin\omega T)$

The response characteristic $G_B(\omega)$ of the amplitude with respect to the frequency of the output signal $B(\omega)$ and the response characteristic $\tau_B(\omega)$ of the delay amount with respect to the frequency of the output singal $B(\omega)$ are provided by the following equations (2) and (3), respectively.

$$G_B(\omega) = 20\log\{\sqrt{(1 + 2l^2) - 2l^2\cos 2\omega T}\,\} \quad (2)$$

$$\tau_B(\omega) = d\theta/d\omega = -2lT \times \frac{\cos\omega T}{(1 + 2l^2) - 2l^2\cos 2\omega T} \quad (3)$$

In the equations, $\omega$ is an angular frequency and $\omega = 2\pi f$ wherein f is a frequency. Variation of the amplitude frequency response characteristic $G_B(\omega)$ and the group delay frequency response characteristic $\tau_B(\omega)$ where a coefficient l is larger than 0 ($l > 0$), are shown in FIG. 6. FIG. 6(A) shows an amplitude frequency response and FIG. 6(B) shows a group delay frequency response, wherein the amplitude and delay amount varies in the direction of the arrow when the coefficient l is made larger. More particularly, as shown in FIG. 6, in the FIG. 5 example, the delay amount varies if the coefficient l is varies in the attenuation setting circuit 10. However, even in the FIG. 5 example, the amplitude as well as the delay amount is varied according to the variation of the coefficient l and thus it is extremely difficult to utilize the FIG. 5 example as a variable equalizer in the TDMA communication system.

SUMMARY OF THE INVENTION

The present invention is directed to an improved variable group delay equalizer capable of varying group delay frequency response of a signal without varying an amplitude frequency response of the signal.

The variable group delay equalizer in accordance with the present invention comprises a signal inputting portion, a delay portion receiving an input signal from the signal inputting portion for controlling a group delay frequency response of the input signal, the signal from the delay portion, the delay frequency response of which was already controlled, having an amplitude distortion caused during the control thereof, and an amplitude correcting portion receiving the group-delay-frequency-response controlled signal for correcting the amplitude distortion included therein. Such correction is made by varying the amplitude of the group-delay-frequency-response controlled signal into a phase opposite to the above described distortion.

Accordingly, a principal object of the present invention is to provide a variable group delay equalizer that amplitude variation becomes very small even if the delay amount is changed, so that the equalizer can be effectively utilized in a TDMA communication system.

This object and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
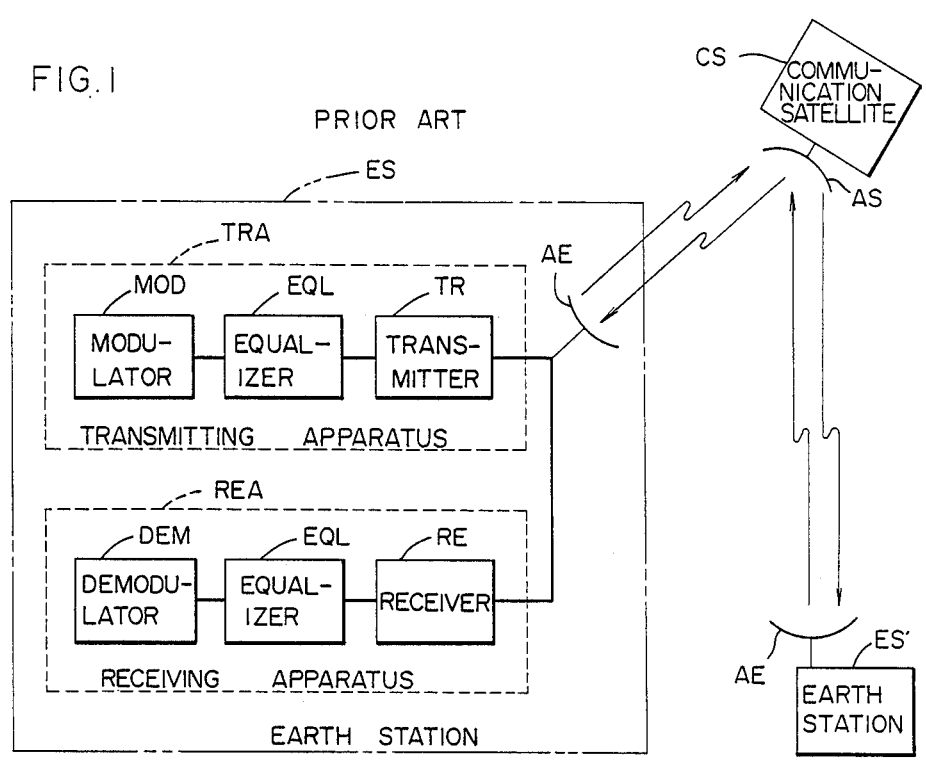
FIG. 1 is a concept of a TDMA communication system which is a background of the present invention.
Figure 2:
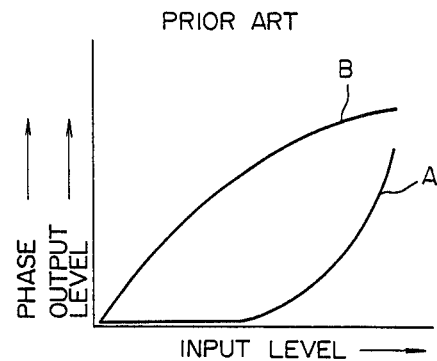
FIG. 2 is a graph showing a characteristic of a high power amplifier included in a communication satellite.
Figure 3:
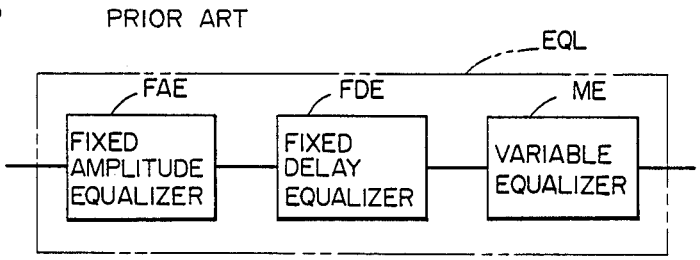
FIG. 3 is a block diagram showing an example of an equalizer for use in a TDMA communication system.
Figure 4:
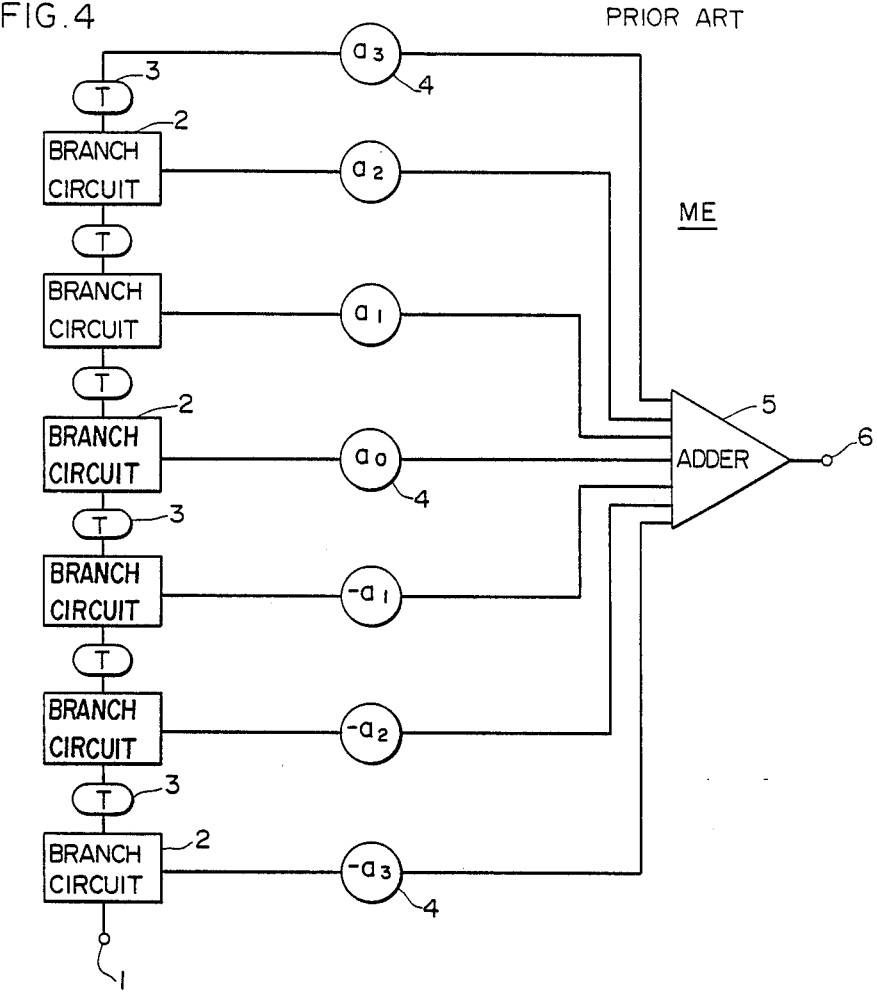
FIG. 4 is a circuit diagram showing an example of a conventional variable equalizer.
Figure 7:
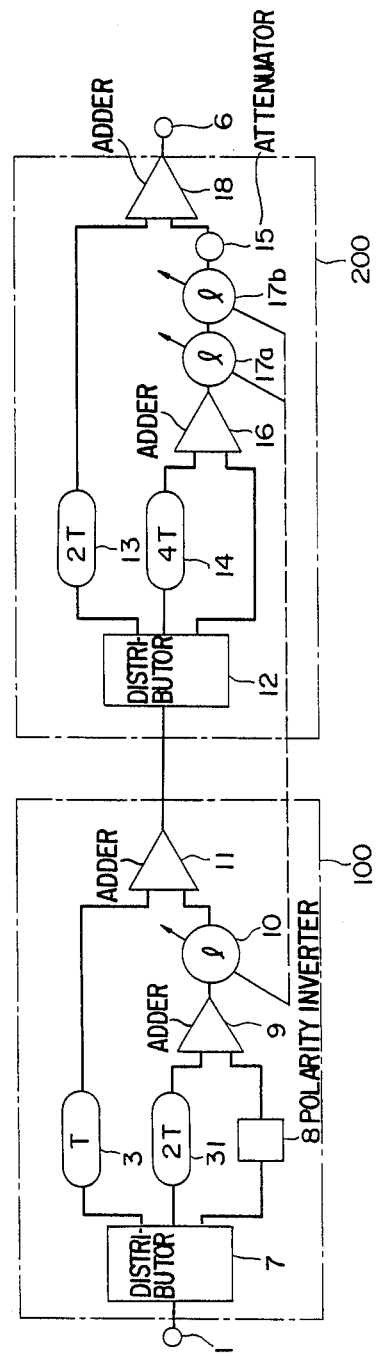
FIG. 7 is a block diagram showing a variable group delay equalizer of one embodiment of the present invention.

FIG. 7 is a block diagram showing an equalizer circuit for use in a TDMA communication system as an embodiment of the present invention. In FIG. 7, a signal from an input terminal 1 is applied to an output terminal 6 through a delay portion 100 and an amplitude correcting portion 200. If and when such variable group delay equalizer is used, for example, in a TDMA communication system as shown in FIG. 1, the input terminal 1 is connected to a modulator (MOD) and the output terminal 9 is connected to a transmitter TR in case where the equalizer should be included in a transmitting system, and the input terminal 1 is connected to a receiver RE and the output terminal 9 is connected to a demodulator DEM in case where the equalizer is included in a receiving system.

Figure 5:
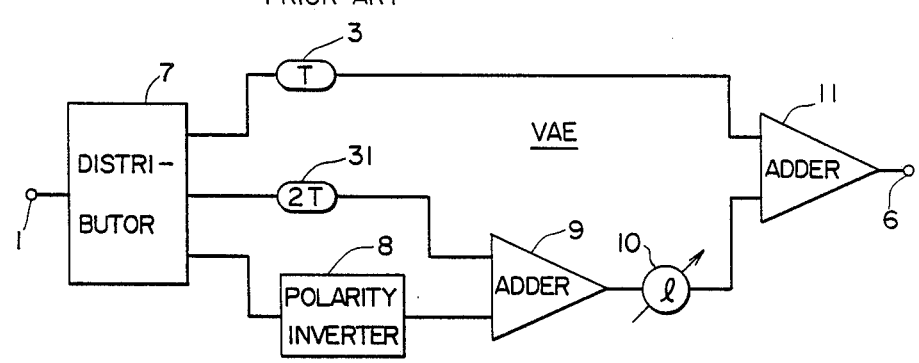
FIG. 5 is a circuit diagram showing another example of a conventional variable equalizer.

In FIG. 7, the structure of the delay portion 100 is the same as that of the variable equalizer ME in FIG. 5 and hence the explanation thereof is omitted. On the other hand, the amplitude correcting portion 200 connected in cascade to the delay portion 100 comprises a distributor 12 which distribute an input signal to three signals, delay lines 13 and 14 delaying the distributed outputs by 2T and 4T, respectively, adder 16 for synthesizing a signal passing through the delay line 14 and a signal which was not delayed, two attenuation setting circuits 17a and 17b which are connected in series to each other and multiply a coefficient l by the synthesized output, a fixed attenuator 15 for fixedly attenuating the output from the attenuation setting circuit 17b, and an adder 18 for synthesizing the output signal from the fixed attenuator 15 and the signal passing through the delay line 13 and for outputting the synthesized signal to the output terminal 9.

Meanwhile, the setting of the respective coefficients l, l (that is, l²) of the attenuation setting circuits 17a, 17b in the amplitude correcting portion 200 is made simultaneously with the setting of the coefficient l of the attenuation setting circuit 10 in the delay portion 100. In other words, the amplitude correcting portion 200 is structured to be set automatically to l² if and when l is set in the delay portion 100.

Figure 8:
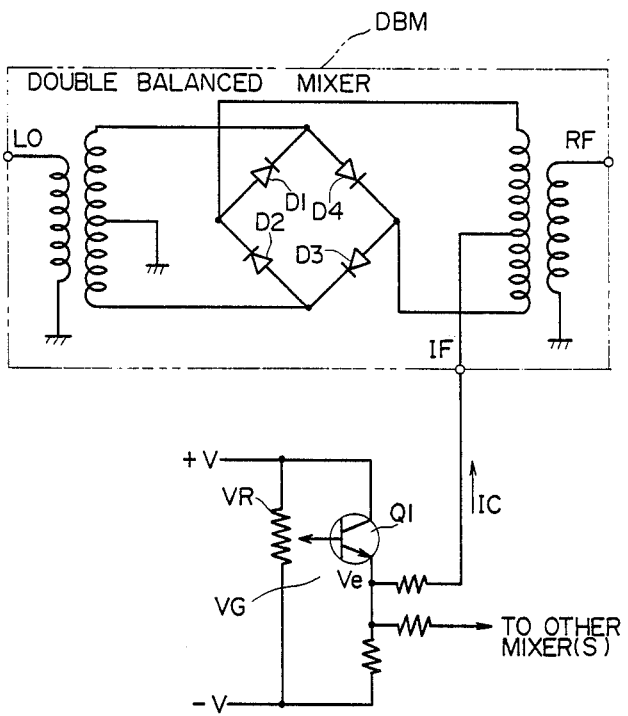
FIG. 8 is a circuit diagram showing an example of a variable attenuation setting circuit.

FIG. 8 is a circuit diagram showing an example of a variable attenuation setting circuit. A variable attenuation setting circuit includes a double balanced mixer DBM and the voltage generator VG for applying a control voltage thereto. The double balanced mixer DBM includes an input terminal LO, and an output terminal RF and a control terminal IF. The double balanced mixer DBM comprises a transformer connected to the input terminal LO and a transformer connected to the output terminal RF, and four diodes D1 to D4 connected in a bridge manner between the two transformers. The control voltage generator VG comprises a variable resistor VR and a transistor Q1 the base of which receives a voltage from the variable resistor VR. The collector of the transistor Q1 and one end of the variable resistor VR are connected to a power supply +V and the emitter of the transistor Q1 and the other end of the variable resistor VR are connected to a power supply −V. The value of the resistance of the variable resistor VR is changed so that the control current Ic flows from the emitter of the transistor Q1 towards the control terminal IF. An output signal from the adder 9, for example, is applied to an input terminal LO of the double balanced mixer DBM and the output terminal RF is connected to an input of the adder 11.

Figure 9:
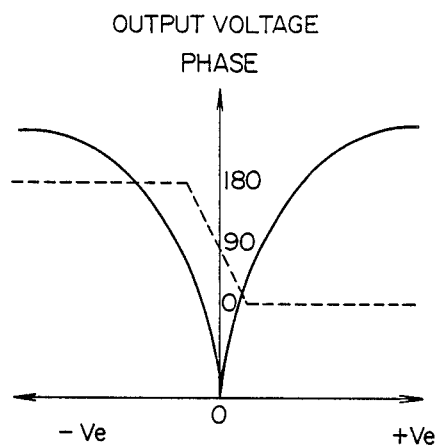
FIG. 9 shows a characteristic of control voltage vs. output voltage and phase of the FIG. 8 embodiment.
Figure 11:
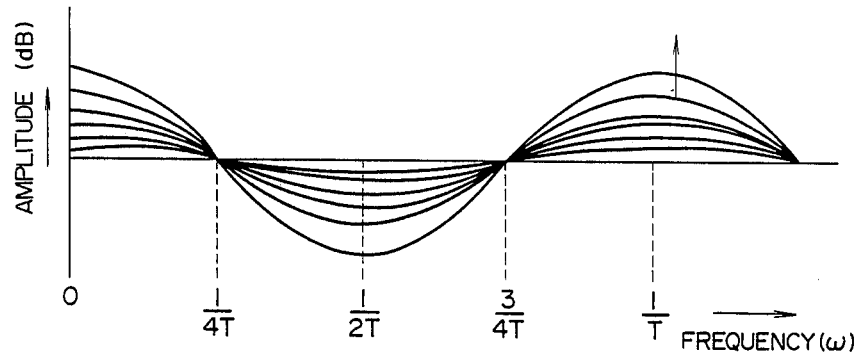
FIG. 11 is a graph showing frequency response characteristic of an amplitude of the FIG. 10 embodiment.

Next, referring to FIG. 9, an operation of the variable attenuation setting circuit as shown in FIG. 8 will be described. An emitter voltage Ve of the transistor Q1 is set within the range from +Ve to −Ve by adjusting the variable resistor VR. The voltage Ve causes a control current Ic to flow into the double balanced mixer DBM through the terminal IF, the direction of the current Ic depending on the polarity of the voltage Ve. If and when the polarity of the voltage Ve is plus, the diodes D1 and D3 become conductive and the diodes D2 and D4 are cut off. Reversely, if and when the polarity of the voltage Ve is minus, the diodes D2 and D4 become conductive and the diodes D1 and D3 are cut off. If and when the voltage Ve is 0V, all of the diodes D1 to D4 are cut off. Accordingly, in the range of plus or minus of the voltage Ve, the polarity of a signal is inverted and thus an output is withdrawn from an output terminal RF. The value of the resistance of the diodes D1 to D4 changes depending on the current Ic and thus, as shown in FIG. 11, an amplitude of the output voltage changes according to the change of the voltage Ve. Thus, it should be understood that the variable attenuation setting circuit as shown in FIG. 8 not only inverts the polarity of a signal passing therethrough, but also varies the amplitude thereof.

Figure 10:
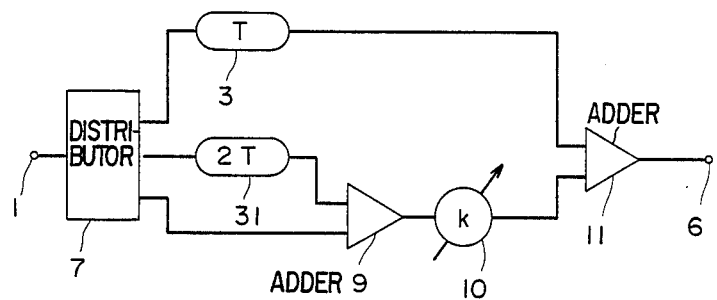
FIG. 10 is a circuit diagram showing an example of a variable amplitude equalizer.

Now, a principle and an operation of the amplitude correcting portion 200 in FIG. 7 will be described using a known variable amplitude equalizer. FIG. 10 is a circuit diagram showing one example of such a known variable amplitude equalizer and is mostly the same as the delay portion 100 in FIG. 7 except that a polarity inverter 8 is omitted. More particularly, an input signal from an input terminal 1 is distributed by a distributor 7. A signal which passes through a delay line 31 is synthesized by an adder 9 with a signal which does not pass through the delay line and thus synthesized signal is applied to an adder 11 through a variable attenuation setting circuit 10 having an attenuation amount or coefficient k. In such a way, the adder 11 synthesizes a main signal passing through the delay line 3 and a subsignal passing through a variable attenuation setting circuit 10 and outputs the synthesized signal to an output terminal 6.

Now, let it be assumed that no attenuation of signals is caused in whole elements other than the attenuation setting circuit 10 and no time delay is caused in elements other than delay lines 3 and 31 and the delay of the main signal is used as a reference which is set to zero. Then, an output signal $A(\omega)$ withdrawn at the output terminal 6 is given in the following equation (4).

$$A(\omega) = \cos\omega t + k\cos\omega(t + T) + k\cos\omega(t - T) \quad (4)$$
$$= (1 + 2k\cos\omega T) \cos\omega t$$

The frequency characteristic $G_A(\omega)$ of an amplitude of the output signal $A(\omega)$ is given in the following equation (5).

$$G_A(\omega) = 20\log(1 + 2k\cos\omega T) \quad (5)$$

However, the group delay frequency response characteristic $\tau_A(\omega)$ is flat. A variation for the coefficient k of the amplitude frequency response characteristic $G_A(\omega)$ is shown in FIG. 11. If the coefficient k is made larger, the amplitude varies in an arrow direction. More particularly, in FIG. 10, a variable amplitude equalizer can be obtained which is capable of varying only an amplitude frequency response without varying the group delay frequency response by varying the coefficient k of the variable attenuation setting circuit 10.

Figure 6:
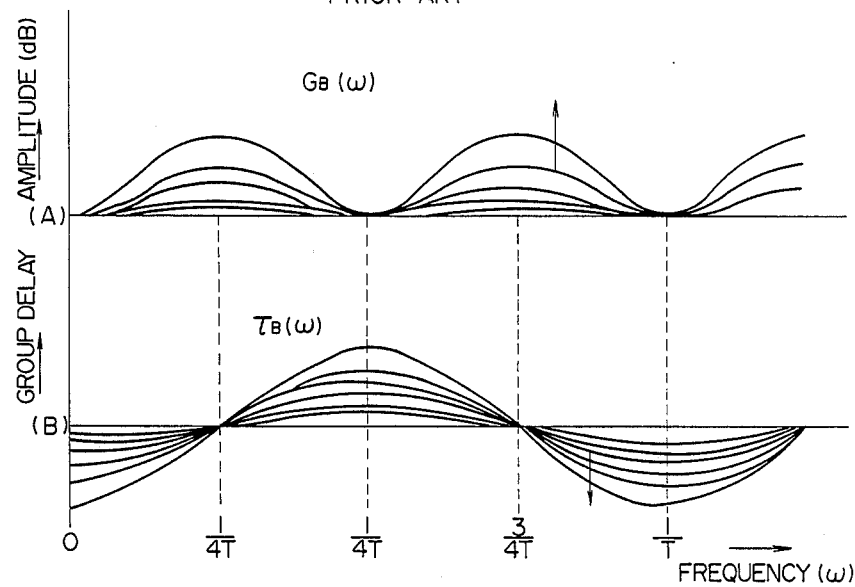
FIG. 6 is a graph of frequency response characteristics of an amplitude and group delay in the example of FIG. 5.

As shown in FIG. 11, a period of repetition of amplitude in the variable amplitude equalizer is 1/T and period of repetition of amplitude in the delay portion 100, that is, in the group delay equalizer in FIG. 5 is $\tfrac{1}{2}T$ as shown in FIG. 6(A).

Accordingly, it should be understood that an amplitude distortion caused in the delay portion 100 can be corrected in the amplitude correcting portion 200 if and when the period of the repetition of amplitude frequency response of the amplitude correcting portion 200 is made to be half so that such period is made to be the same as that in the delay portion 200 and the polarity of the amplitude is made to be reversed.

Now, an operation of a variable group delay equalizer which is a preferred embodiment of the present invention shown in FIG. 7 will be described. In FIG. 7, the delay lines 3 and 31 in the delay portion 100 are set to have a delay amount T and 2T, respectively and the delay lines 13 and 14 in the amplitude correcting portion 200 are set to have 2T and 4T, respectively, which are two times of the delay amounts in the delay portion 100.

With such a state, we assume that no attenuation of signal is caused in all elements other than the attenuation setting circuits 17, 17a, 17b and the fixed attenuator 15 and no time delay is caused in all elements other than the respective delay lines. In addition, let it be assumed that the coefficient of the attenuation setting circuit 10 is l, and the summed coefficient of circuits including the fixed attenuator 15 and the attenuation setting circuits 17a and 17b are k, then the amplitude frequency response characteristics $G_B(\omega)$ and $G_A(\omega)$ are represented by the above described equations (2) and (5). In this case, since the delay portion 100 and the amplitude correcting portion 200 are connected in cascade, the total amplitude frequency response characteristic $G_C(\omega)$ is represented by a sum of these amplitude frequency response characteristics and hence is represented in the following equation.

$$G_C(\omega) = G_B(\omega) + G_A(\omega) \tag{6}$$

$$= 20\log(1 + 2k\cos2\omega T)\sqrt{(1 + 2l^2) - 2l^2\cos2\omega T} \tag{7}$$

$$= 20\log\sqrt{[1 + 2l^2) + \{4k(1 + 2l^2) - 2l^2\}\cos2\omega T + \{4k^2(1 + 2l^2) - 8kl^2\}\cos^22\omega T - 8k^2l^2\cos^32\omega T]}$$

The attenuation setting circuits 10, 17a and 17b gang with each other and have the same coefficient l. Let it be assumed that the fixed attenuator 15 has an attenuator amount 6dB, that is, the coefficient is 0.5, the whole coefficient k is given in the following.

$$k = 0.5 \times l \times l = \frac{l^2}{2}$$

Substituting the above described equation for the equation (7), the following equation (8) is obtained.

$$G_C(\omega) = 20\log\sqrt{[(1 + 2l^2) + 4l^4\cos2\omega T + (2l^6 - 3l^4)\cos^22\omega T - 2l^6\cos^32\omega T]} \tag{8}$$

Comparing the above described equation (8) with the conventional equation (2), it is understood that the term in which an amplitude varies with respect to a frequency becomes very small, since $|1| < 1$ and hence the power of l in the equation (8) is larger than that in the equation (2).

On the other hand, the group delay frequency response characteristic $\tau_C(\omega)$ at this time is the sum of those in the delay portion 100 and the amplitude correcting portion 200. However, since the amplitude correcting portion 200 has no group delay frequency response characteristic, the total group delay frequency response characteristic $\tau_C(\omega)$ is $\tau_b(\omega)$ shown in the above described equation (3). That is, $\tau_C(\omega) = \tau_B(\omega)$.

Figure 12:
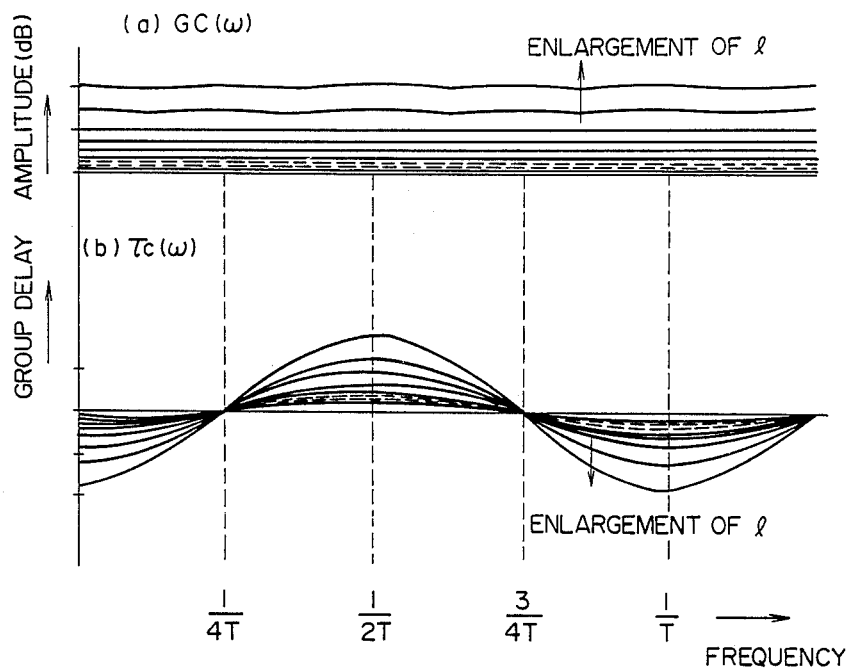
FIG. 12 shows respective frequency response characteristics of an amplitude and group delay of the FIG. 7 embodiment.

FIG. 12 shows an amplitude frequency response characteristic $G_C(\omega)$ and a group delay frequency response characteristic $\tau_C(\omega)$ in the FIG. 7 embodiment. Although FIG. 12 shows a variation in case of $l > 0$, in the range of coefficient $l < 0$, a sign of $\tau_B(\omega)$ in the equation (3), that is, $\tau_C(\omega)$ is reversed and thus the leading and the lag of the delay amount are reversed with respect to the reference. $G_C(\omega)$ in the equation (8) is not reversed if the absolute value of the coefficient l is equal even in case of the coefficient $l < 0$. More particularly, if and when the coefficient l changes from plus to minus, the delay amount reverses and changes as shown in an arrow shown in FIG. 13, but the amplitude frequency response characteristic $G_C(\omega)$ simply repeats the variation such as in FIG. 12(A).

As described in the foregoing, it will be understood that the FIG. 7 embodiment can vary only the group delay frequency response without any amplitude variation. Accordingly, since, if such a variable group delay equalizer is employed as a variable equalizer in the TDMA communication system, only deterioration of a bit error rate due to group delay distortions can be independently equalized, an operation for seeking an optimum point is extremely readily made as compared with a conventional case where an amplitude frequency response and a group delay frequency response change together.

Meanwhile, in the above described embodiments, a double balanced mixer including a polarity reverse is used as the attenuation setting circuits 10, 17a and 17b. However, it will be readily understood by those skilled in the art that such attenuation setting circuit can be achieved by a variable attenuator or the like excluding a polarity reverse in case where a variable range is restricted depending on the usage. In addition, not only a 180° phase shifter but also a 180° adder, a 180° distributor, a 90° adder or a 90° distributor can be utilized as the polarity inverter 8. For example, a 180° adder can be disposed in the adder 9 so that both of functions of the polarity inverter 8 and the adder 9 may be obtained. Similarly, a 90° adder and distributor may be employed in the input of the adder 9 and the output of the distributor 7.

Furthermore, the attenuation setting circuits 10, 17a and 17b and a fixed attenuator 15 may be adapted such that the ratio of the amplitudes of the signals input to the adders 11 and 18 can be made constant and the position to be inserted may be arbitrarily selected as long as such requirement is satisfied. For example, the fixed attenuator 15 may be provided in two lines, respectively, between the distributor 12 and the adder 16.

Figure 14:
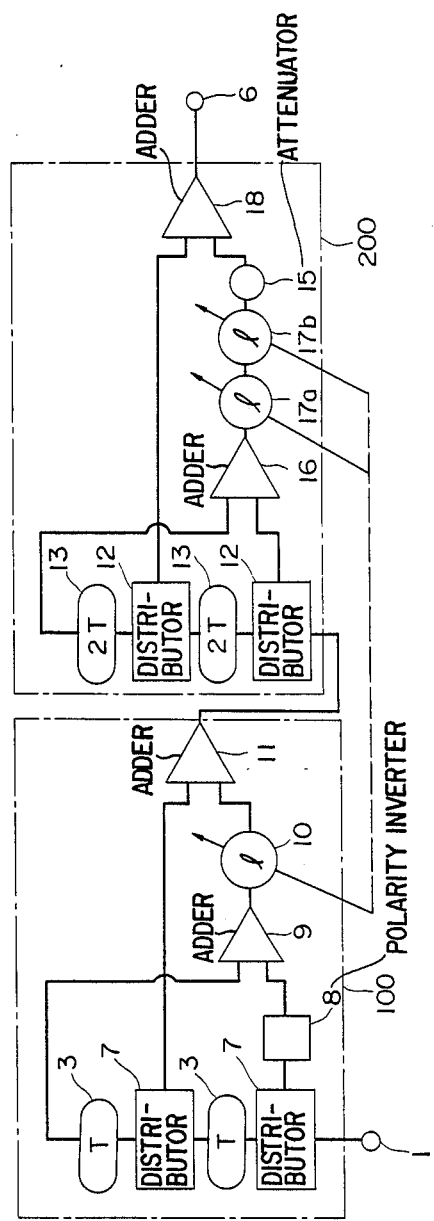
FIG. 14 is a block diagram showing a variable group delay equalizer of another embodiment of the present invention.
Figure 15:
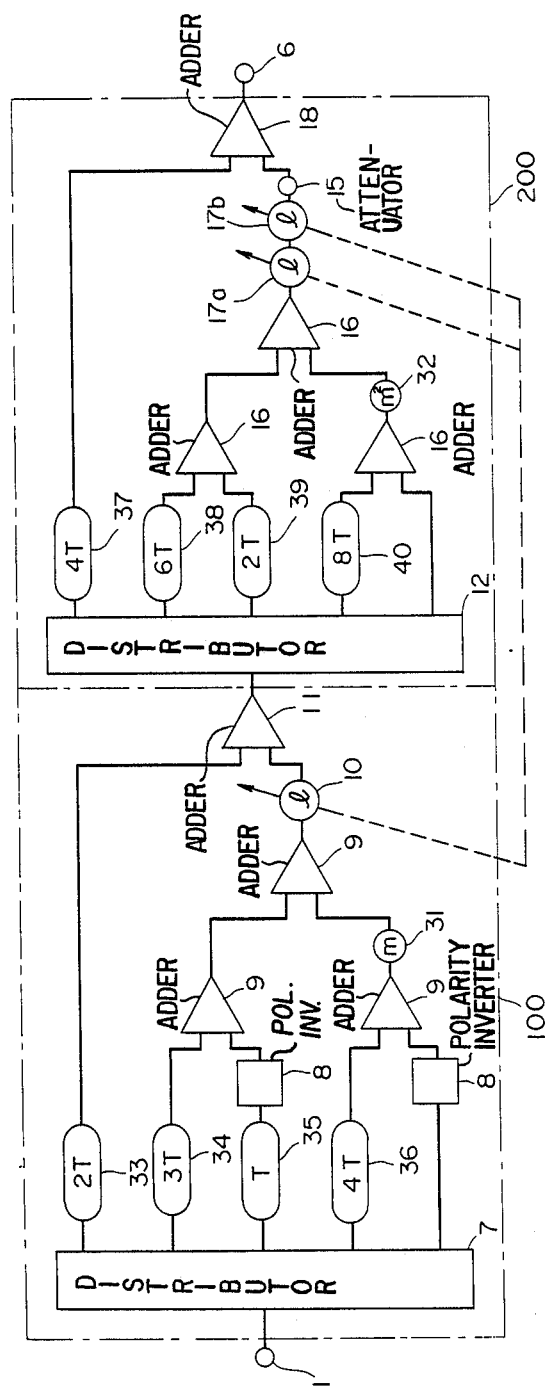
FIG. 15 is a block diagram showing a variable group delay equalizer of a further embodiment of the present invention.

Although in the FIG. 7 embodiment, a delay line is provided after distribution of an input signal, distributors 7 and 12 and delay lines 3 and 13 can be alternately provided such as another embodiment shown in FIG. 14. In addition, the delay lines 3, 4, 13 and 14, the polarity inverter 8 and the adder 9 in FIG. 7 can be structured in a two-stage (or n-stage) manner such as a further embodiment as shown in FIG. 15. In the FIG. 15 embodiment, an attenuation amount of a fixed attenuator 32 is set to a square of that of the fixed attenuator 31. Such a restriction is needed for achieving a principle of the present invention as well as the restriction of the coefficient l of the attenuation setting circuit. The delay lines 33–40 have delay amounts indicated in the blocks, respectively.

Figure 16:
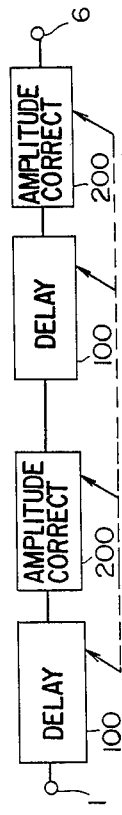
FIGS. 16, 17 and 18 are block diagrams showing a variable group delay equalizer with a wider variable range in accordance with the present invention.

In practically using a variable group delay equalizer, a wider variable range is sometimes needed. In such a case, a cascade connections of the delay portion 100 and the amplitude correcting portion 200 are connected in cascade manner of two or n stages as shown in FIG. 16, and the attenuation setting circuits may gang with each other, although in the FIG. 7 embodiment, a cascade connection of the delay portion 100 and the amplitude connecting portion 200 is in a single stage. According to the FIG. 16 embodiment, a variable group delay equalizer having an extremely good amplitude frequency response characteristic and a wider variable range can be obtained, while the structure of circuit becomes complicated.

Figure 17:
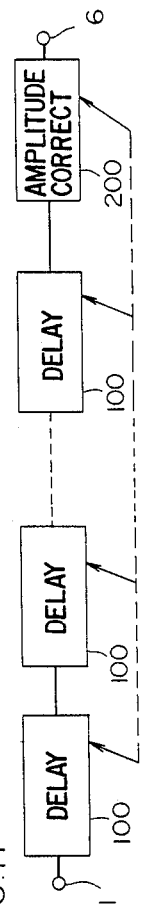

For the purpose of simplifying a structure of circuit, a single stage of amplitude correcting portion 200 may be provided with respect to n-stages of the delay portions 100, as shown in FIG. 17. In this case, a minimum amplitude deflection (an amplitude variation with respect to frequency) can be always maintained irrespective of variation of coefficient of an attenuation setting circuit by setting a fixed attenuator 15 in the amplitude correcting portion 200 such that an amplitude deflection of the amplitude frequency response characteristic becomes minimum. Although the FIG. 17 circuit includes a single stage of amplitude correcting portion 200, it may include m stages of amplitude correcting portions 200. In such a case, the value of a fixed attenuator 15 may be set in the above described manner. According to the FIG. 17 embodiment, a variable group delay equalizer having a wider variable range can be obtained with a relatively simply circuit, although an amplitude frequency response characteristic deteriorates.

Then, a practically desired example for obtaining a wider variable range will be described in the following. In this example, a fixed group delay equalizer and a variable group delay equalizer are employed. A fixed group delay equalizer without any variation of amplitude frequency response characteristic can be obtained as a modification of the FIG. 7 apparatus, by removing the attenuation setting circuits 10, 17a an 17b in the delay portion 100 and the amplitude correcting portion 200 of FIG. 7 embodiment. However, the attenuation setting circuit in the delay portion 100 may be left so that a switchable apparatus may be made among three modes such as the coefficient 0 (infinite loss) and the constant coefficients (in phase and out of phase).

Figure 18:
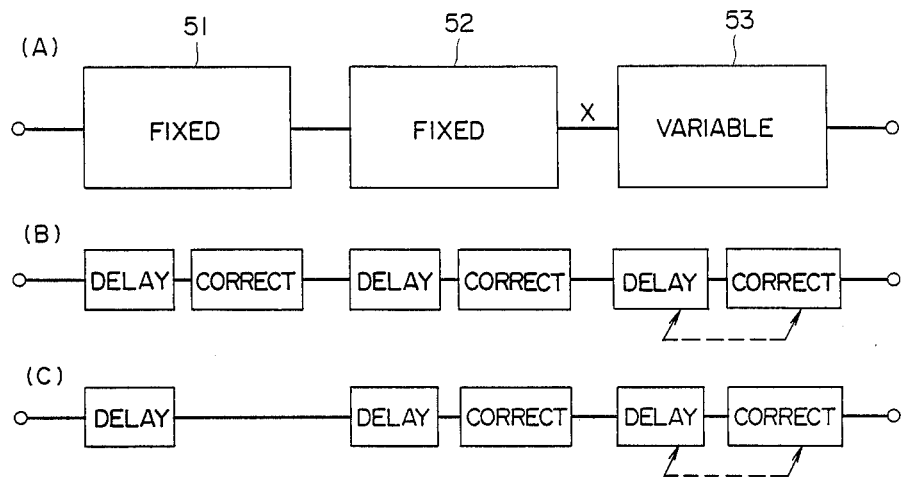

FIG. 18 shows a preferred embodiment of the present invention for obtaining a wider variable range. As shown in FIG. 18(A), in this embodiment, two fixed group delay equalizers 51 and 52 and a single variable group delay equalizer 53 are connected in series. The FIG. 7 apparatus may be used as a variable group delay equalizer 53, for example, and the modification of the FIG. 7 apparatus as explained in the foregoing may be employed as fixed group delay equalizers 51 and 52, for example. As shown in FIG. 18(B), each of the fixed group delay equalizers may comprise a delay portion and an amplitude correcting portion and, as shown in FIG. 18(C), the amplitude correcting portion may be provided commonly in the delay portion of each of the fixed group delay equalizers. A number of fixed group delay equalizers and a number of variable group delay equalizers may be properly increased or decreased.

Figure 19:
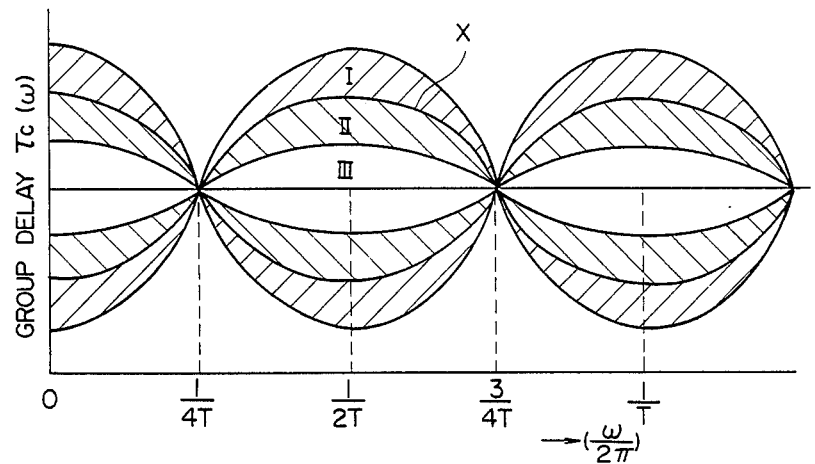
FIG. 19 shows a variable range of the FIG. 18 embodiment.

FIG. 19 shows a variable range of the FIG. 18 embodiment. In FIG. 19, X represents an output of two fixed group delay equalizers 51 and 52 connected in series. A variable range shown in the region I is obtained by varying a group delay frequency response characteristic of a variable group delay equalizer 53 so that the characteristic is made to be in phase of the group delay frequency response characteristic of the fixed group delay equalizers 51 and 52. A variable range shown in a region II is obtained by varying the group delay frequency response characteristic of the variable group delay equalizer 53 so that such characteristic may be made to be out of phase with respect to the group delay frequency response characteristic of the fixed group delay equalizers 51 and 52. A variable range represented in a region III is obtained by removing the fixed group delay equalizers 51 and 52 from the lines and only using the variable group delay equalizer 53.

Figure 20:
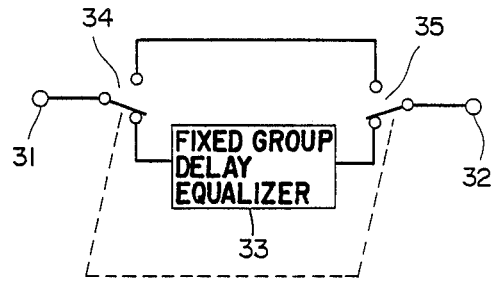
FIG. 20 shows a conventional circuit for switching a fixed group delay equalizer to be a flat characteristic.

FIG. 20 is a conventional circuit for making a fixed group delay equalizer a flat characteristic. In FIG. 20, one of the fixed group delay frequency response characteristic and a flat characteristic can be selected by switching the fixed group delay equalizer 33 by means of relays 34 and 35.

In the event that there is a requirement that one of the state having a certain group delay frequency response characteristic and the flat state is selected without changing an electrical length and without interrupting signal, the FIG. 20 structure can not satisfy such requirement, since a signal is interrupted at the time of switching the relays and the electrical path in the loop changes.

Although it is possible to select one of the flat state and the state having a certain group delay frequency response characteristic by using an attenuation setting circuit, the characteristic deteriorates rather than a theoretical curve due to a little change of electrical length and the frequency characteristic, when the coefficient of the attenuation setting circuit is changed. In addition, an insertion loss of the attenuation setting circuit becomes large and there is change of return loss, and hence amplifiers and the like are needed for compensation thereof, which makes the apparatus expensive.

An example will be described in the following, which eliminates the above described defects and can select one of the flat state and the state having a certain characteristic without any interruption due to a switching operation and without any change of an electrical length.

Figure 21:
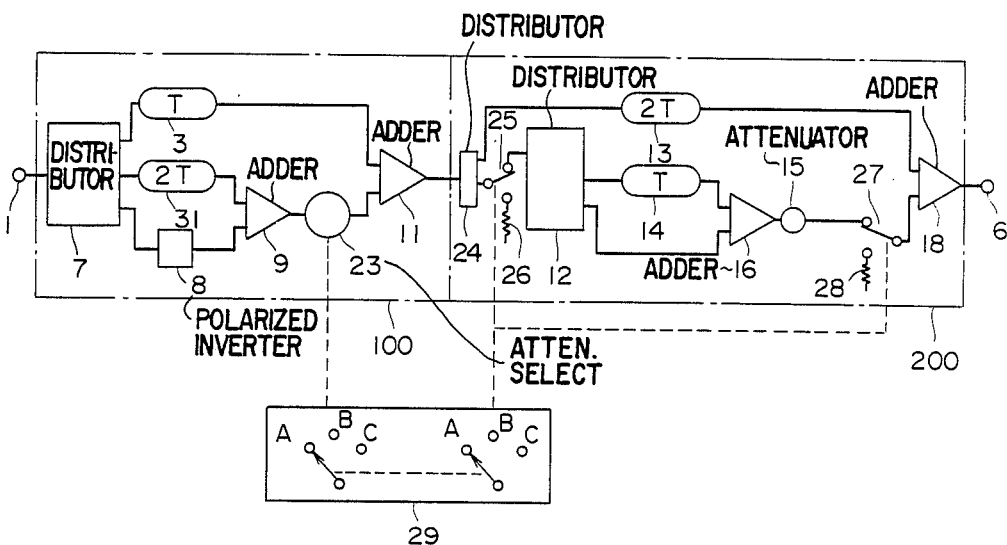
FIG. 21 shows a circuit utilizing the FIG. 7 embodiment, and capable of switching to a flat characteristic.

FIG. 21 shows an apparatus capable of selecting one of the flat state and the state having a certain characteristic, utilizing the FIG. 7 embodiment. In FIG. 21, the same reference numerals as those in FIG. 7 denote the same or similar elements. The different points from the FIG. 7 structure are that (1) an attenuation setting circuit 10 in a delay portion 100 is replaced by an attenuation selecting circuit 23 which can select one of the coefficient 0 (infinite loss) and constant coefficients (in phase and out of phase), and (2) the amplitude correcting portion 200 first distributes an input in a distributor 24 and a main signal is connected to an adder 18 through a delay line 13 and a subsignal passes through a relay 25, one contact of the relay 25 being connected to an ending terminal 26 and the other contact being connected to a conventional distributor 12, and the attenuation setting circuits 17a, 17b are removed, the output of the fixed attenuator 15 is coupled to an adder 18 through a relay 27, the other contact of the relay 27 being connected to an ending terminal 28. A ganging switch 29 has three contacts a, b and c and provides to the attenuation selecting circuit 23 a coefficient of in-phase at the state a, a coefficient of OFF at the state b and a coefficient of out-of-phase at the state c. For the relays 25 and 27, the switch 29 is connected to the distributor 24 and the adder 18 at the positions a and c, respectively and is connected to the ending terminals 26 and 28 at the position b.

Figure 22:
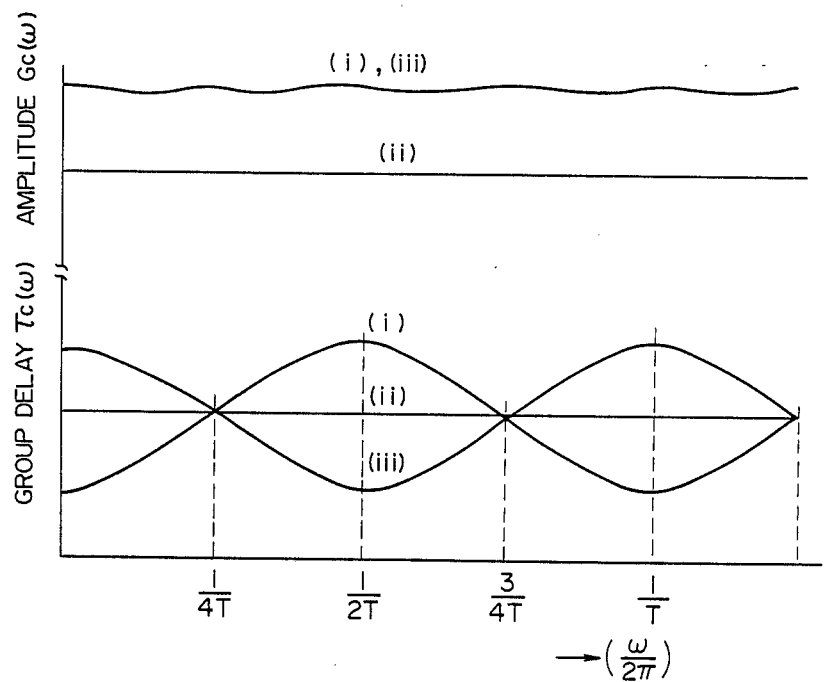
FIG. 22 shows an amplitude and group delay frequency response of the FIG. 21 embodiment.

Now an operation will be described. If and when the device of FIG. 21 is adjusted at the position A of the ganging switch 29 so that it has a fixed group delay frequency response characteristic arbitrarily determined by the attenuation selecting circuit 23 and the fixed attenuator 15, the device has a characteristic shown in FIG. 22(i) at the position A of the ganging switch 29, a characteristic shown in FIG. 22(ii) at the position B and characteristic shown in FIG. 22(iii) at the position C which is a reverse characteristic of FIG. 22(i). It is clear from the theory of the FIG. 7 circuit that the characteristics (i) and (iii) have a characteristic opposite to each other and it is also clear that the characteristic (ii) becomes flat since a signal passes through only a main signal line. Meanwhile, since a signal is switched while keeping the main signal line being connected, an interruption of signal such as in FIG. 20 device never occurs. In addition, an electrical length never changes since such electrical length is determined based on a main signal line.

Although the present apparatus utilizes the relays 25 and 27, a switching circuit and the like comprising transistors having the same function may be used. In addition, although the present apparatus uses two relays 25 and 27, one of these relays can be omitted only if an isolation of a relay is excellent. Furthermore, if and when a subsignal line in an amplitude correcting portion can be made to be interrupted, the position where the relay is to be disposed is not critical. For example, the relay may be disposed in two lines after the distributor 12.

The attenuation setting circuit 23 may be a double balanced mixer or the like including a polarity reverse. However, in case where a reverse characteristic (iii), for example, is not needed depending on the usage, a structure without polarity reverse may be possible, such as relay.

Figure 23:
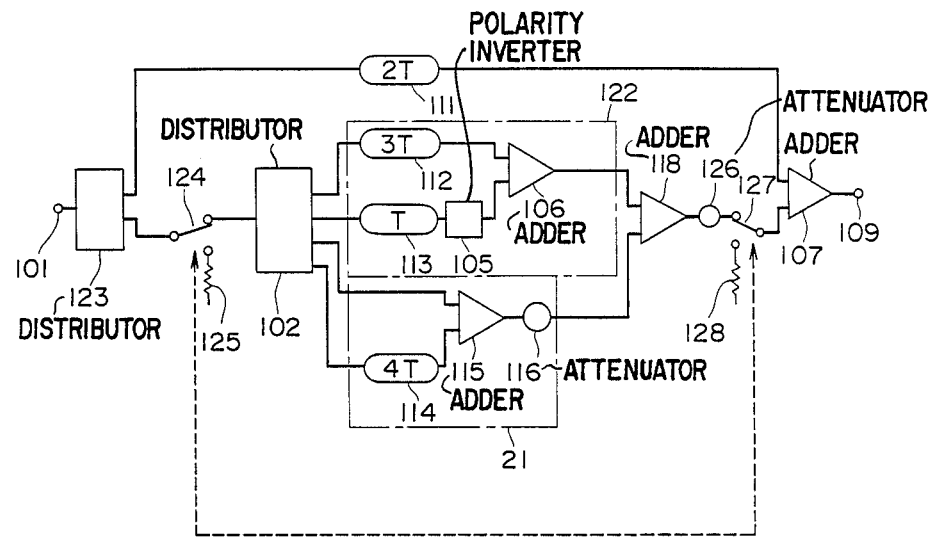
FIG. 23 shows an example of a fixed group delay equalizer which is utilized in the FIG. 18 embodiment and is capable of switching into a flat characteristic.

A separate apparatus different from the above described apparatus in FIG. 21 may be used as the fixed group delay equalizers 51 and 52 in FIG. 18. FIG. 23 shows such an example of the separate apparatus. The FIG. 23 apparatus can achieve substantially the same function as that of the FIG. 21 apparatus.

Figure 24:
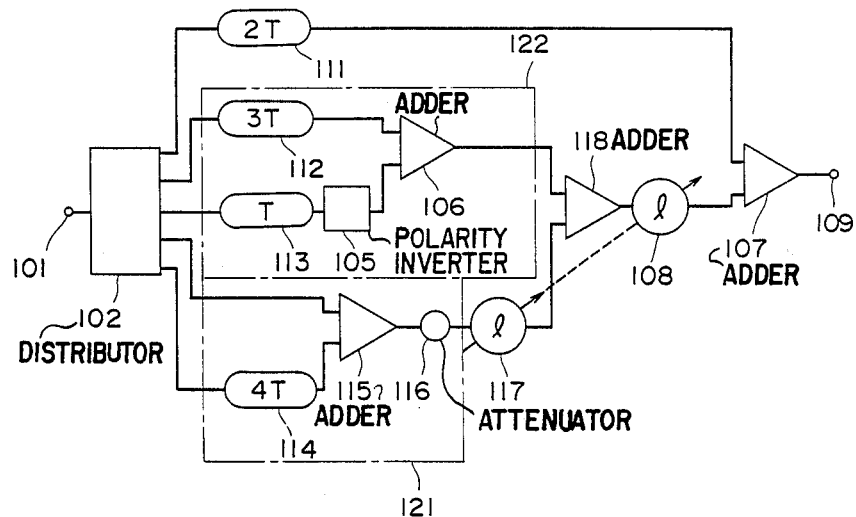
FIG. 24 shows a variable group delay equalizer as a premise of the FIG. 23 apparatus.

An apparatus shown in FIG. 24 is of an apparatus as a premise of the FIG. 23 apparatus and can vary a group delay frequency response characteristic without varying an amplitude frequency response characteristic, just like the FIG. 7 apparatus which is a premise of the FIG. 21 apparatus. In an operation of the FIG. 24 apparatus, a signal inputted to an input terminal 101 is divided into five by a distributor 102. The first one is applied to an adder 107 as a main signal which is delayed by a delay amount 2T in a delay circuit 111. The second one is applied to an adder 106 which is delayed by a delay amount 3T in a delay circuit 112. The third one is applied to adder 106, which is delayed by T in a delay circuit 113 and the polarity thereof is inverted by the polarity inverter 105. A synthesized signal of the second and the third ones is applied to an adder 118 as a signal to a delay portion 122. The fourth one is directly applied to an adder 115 and the fifth one is applied to adder 115, which is delayed by 4T in a delay circuit 114. A synthesized signal of the fourth and fifth ones attenuates through the fixed attenuator 116 and passes through an attenuation setting circuit 117 and then is applied to an adder 118 as a signal to an amplitude correcting portion 12. Such synthesized signal passes through an attenuation setting circuit 108 and then is synthesized with a main signal in an adder 107, which synthesized signal is applied to an output terminal 109. The attenuation setting circuits 108 and 117 have the same attenuation characteristic and gang with each other.

Let it be assumed that no attenuation of signal is caused in all the elements except for the attenuation setting circuits 108 and 117 and the attenuator 116 and no time delay is caused in all the elements except for the delay lines. Assuming that the coefficient of the attenuation setting circuit 108 is 1 and a total coefficient of the attenuator 116 and the attenuation setting circuits 108 and 117 is k, the output signal is represented by the following equation.

$$C(\omega) = \cos\omega\tau - + l\cos\omega(t + T)l\cos\omega(t - T) + \quad (9)$$
$$k\cos\omega(t - 2T) + k\cos\omega(t + 2T)$$

$$= \sqrt{(1 + 2l^2) + 2(2k - l^2)\cos^2 2\omega T + 4k^2\cos^2\omega T} \cdot \quad (10)$$

$$\sin\left(\omega t + \tan^{-1}\frac{1 + 2k\cos 2\omega T}{-2l\sin\omega T}\right)$$

The amplitude frequency response characteristic of $C(\omega)$ is represented by the following equation (11).

$$G_c(\omega) = 20\log(\sqrt{(1 + 2l^2) + 2(k - l^2)\cos2\omega t + 4k^2\cos^2 2\omega T}\,) \quad (11)$$

Now, assuming that the attenuation setting circuit 108 and gang with each other and have the coefficient l and the fixed attenuator circuit 116 has an attenuation amount 6 dB, that is, the coefficient thereof is 0.5, $$k = 0.5 \times l \times l = \frac{l^2}{2} \quad (12)$$

Substituting the above described equation (12) for the equation (11), the second term within the root sign becomes 0 and thus the above described equation (11) is given in the following equation (13).

$$G_c(\omega) = 20\log(\sqrt{(1 + 2l^2) + l^4\cos^2 2\omega t}\,) \quad (13)$$

A group delay frequency response characteristic $\tau_C(\omega)$ is represented by the following equation (14).

$$\tau_C(\omega) = -2Tl \cdot \frac{l^2\sin 2\omega T \sin\omega T + (l^2 + 1)\cos\omega T}{1 + 2l^2 + l^4\cos^2 2\omega T} \quad (14)$$

Figure 13:
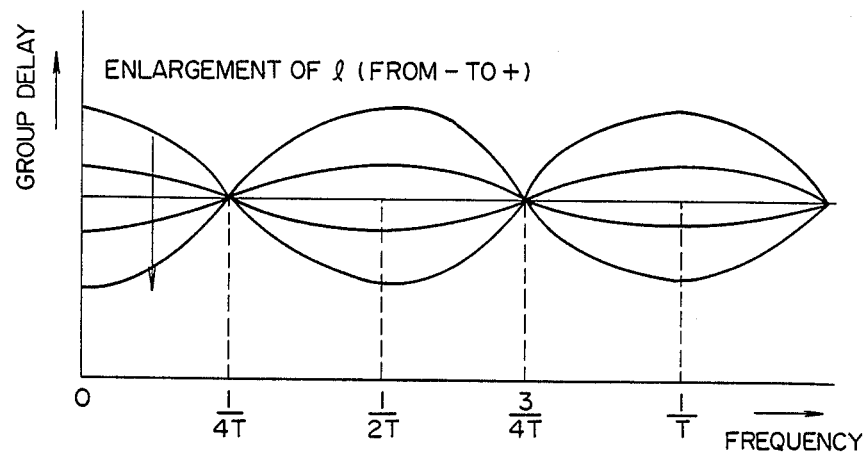
FIG. 13 shows a frequency response characteristic of group delay of the FIG. 7 embodiment.

The variation characteristic of the amplitude frequency response characteristic $G_C(\omega)$ and the group delay frequency response characteristic $\tau_C(\omega)$ with respect to the coefficient l are shown in FIG. 12, just like the FIG. 7 apparatus. If the coefficient l is made larger, the amplitude and the delay amount vary, respectively, in an arrow direction. If and when the coefficient l changes from plus to minus, the group delay frequency response characteristic reverses and changes in an arrow direction as shown in FIG. 13, but the amplitude frequency response characteristic simply repeats the variation such as in FIG. 12(a).

Returning to FIG. 23, the different points from FIG. 24 are as follows. An input is distributed by a distributor 123 and the distributed signal passes through a relay 124. One contact of the relay 124 is connected to a terminal 125 and the other contact of the relay 124 is connected to a conventional distributor 102. The coefficient setting circuits 108 and 117 in FIG. 24 are removed in FIG. 23. Thus, an output from a fixed attenuator 126 is connected to a adder 107 through a relay 127. The opposite side of the relay 127 is connected to a terminal 128.

Figure 25:
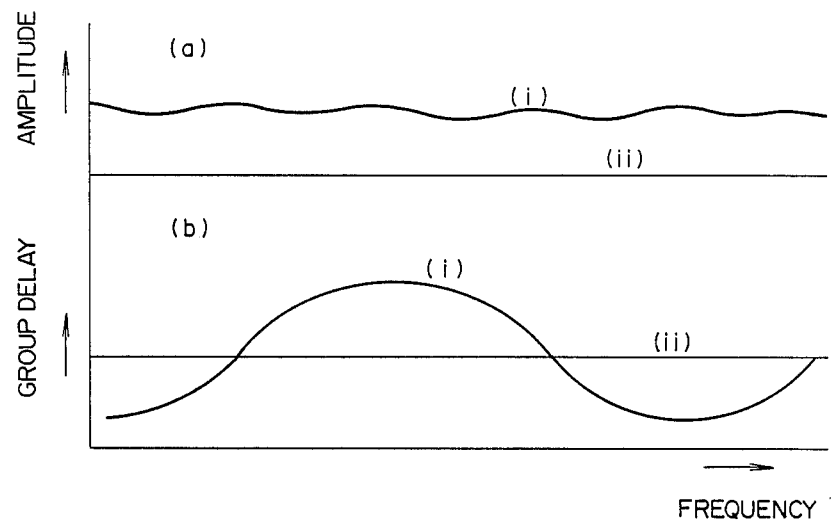
FIG. 25 shows an amplitude and frequency characteristics of the FIG. 24 embodiment.

If and when the fixed attenuators 116 and 126 are adjusted so as to have a fixed group delay frequency response characteristic arbitrarily determined, the characteristic as shown in FIG. 25(i) is obtained when the relays 124 and 127 are connected to the distributor and the adder as shown in FIG. 23. If and when the relays 124 and 127 are switched so that the relays are connected to the terminals 125 and 128, respectively, then the characteristic becomes flat such as in FIG. 25(ii). The reason is that such characteristic is determined by only a main signal line which is structured by the distributor 123, the delay line 111 and the adder 107. In addition, in this embodiment, a signal is switched while the main signal line is kept being connected, and hence an interruption of signal such as in the FIG. 20 apparatus never occurs and an electrical length never changes since such length is determined by the main signal line.

Although the above described apparatus uses the relays 124 and 127, any switching circuit such as transistor having the same function may be used. In addition, although two relays are used, one of these can be omitted if an isolation of the relay is good. Any position where the relay is disposed will do as long as both of the delay portion and the amplitude correcting portion are simultaneously interrupted. For example, the relay may be disposed in the four lines after the distributor 102.

Figure 26:
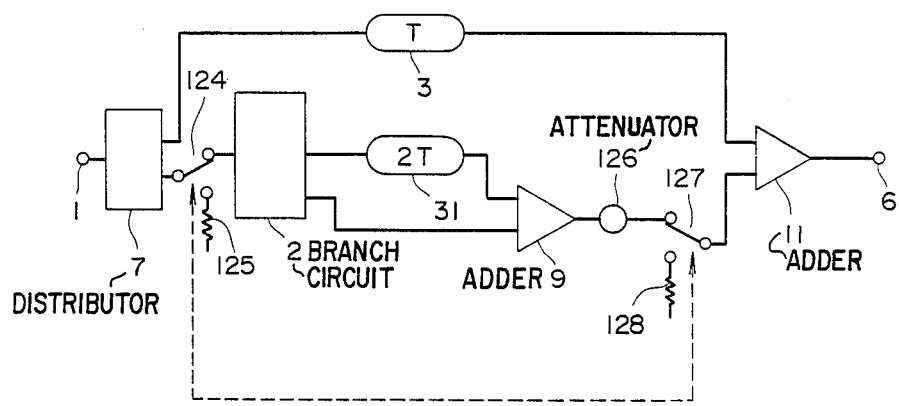
FIG. 26 shows an amplitude equalizer capable of switching to a flat characteristic.

Although FIGS. 21 and 23 show examples in which the above described concept applies to a group delay equalizer, such concept can apply to an amplitude equalizer such as in FIG. 26. In FIG. 26, the same reference numerals as those in FIG. 10 or FIG. 23 denote the same or similar elements. In addition, generally, the above described principle can apply to a transversal type of variable equalizer as an ON/OFF type of switch.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A variable group delay equalizer comprising:
    a signal inputting means;
    a delay means receiving an input signal from said signal inputting means for controlling a group delay frequency response characteristic of the input signal and for providing a controlled signal, the controlled signal from said delay means having an amplitude distortion which is caused during the control thereof; and
    an amplitude correcting means receiving said controlled signal from said delay means for correcting said amplitude distortion included therein, said amplitude correcting means including correcting means for varying an amplitude of said controlled signal in an opposite sense to amplitude variation included in said amplitude distortion caused by said delay means,
    wherein said amplitude correcting means is further operable for providing a flat characteristic to the group delay equalizer and free of any amplitude distortion by said delay means.

2. A variable group delay equalizer in accordance with claim 1, wherein
    said delay means comprises
        a first signal withdrawing means for distributing and delaying the received input signal for withdrawing a first main signal and at least a pair of subsignals, said pair of subsignals comprising a first subsignal which is of time leading of a first predetermined time period with respect to said first main signal and second subsignal which is of time lag of said first predetermined time period with respect to said first main signal;
        first synthesizing means for inverting a polarity of one of said pair of subsignals and for synthesizing the polarity-inverted subsignal and the other of said pair of subsignals;
        first amplitude varying means for varying an amplitude of the synthesized signal from said first synthesizing means; and
        second synthesizing means for synthesizing the output signal from said first amplitude varying means and said first main signal;
    said amplitude correcting means comprises second signal withdrawing means receiving the synthesized signal from said second synthesizing means for distributing and relaying the synthesized signal for withdrawing a second main signal and at least one pair of subsignals, said pair of subsignals comprising a third subsignal which is of time leading of a second predetermined time period with respect to said second main signal and a fourth subsignal which is of time lag of said second predetermined time period with respect to said second main signal;

third synthesizing means for synthesizing said third subsignal and said fourth subsignal;

second amplitude varying means for varying an amplitude of the synthesized signal from said third synthesizing means; and fourth synthesizing means for synthesizing an output signal from said second amplitude varying means and said second main signal.

3. A variable group delay equalizer in accordance with claim 2, wherein said first amplitude varying means includes a first attenuation setting means for setting an attenuation of the synthesized signal from said first synthesizing means, the first attenuation setting means having a first variable coefficient, said second amplitude varying means includes a second attenuation setting means for setting an attenuation of the synthesized signal from said third synthesizing means, the second attenuation setting means having a second variable coefficient.

4. A variable group delay equalizer in accordance with claim 3, wherein said first attenuation setting means is adapted to gang with said second attenuation setting means.

5. A variable group delay equalizer in accordance with claim 3, wherein said second variable coefficient is a multiple of a square of said first variable coefficient.

6. A variable group delay equalizer in accordance with claim 2, wherein said second predetermined time period is twice said first predetermined time period.

7. A variable group delay equalizer in accordance with claim 2, wherein said first signal withdrawing means comprises a distributor for distributing a received signal, delay means for delaying the signal from said distributor by said first predetermined time period and withdrawing such delayed signal as said first main signal;

delay means for delaying the signal from said distributor by twice said first predetermined time period and withdrawing the delayed signal as said second subsignal; and outputting means for applying the signal from said distributor as said first subsignal.

8. A variable group delay equalizer in accordance with claim 2, wherein said second signal withdrawing means comprises a distributor for distributing said synthesized signal received from said second synthesizing means;

delay means for delaying the signal from said distributor by said second predetermined time period and withdrawing the delayed signal as said second main signal;

delay means for delaying the signal from said distributor by twice said second predetermined time period and withdrawing the delayed signal as said fourth subsignal; and outputting means for applying the signal from the distributor as said third subsignal.

9. A variable group delay equalizer in accordance with claim 2, wherein said first signal withdrawing means comprises a first distributor for distributing the received signal;

outputting means for applying the signal from said first distributor as said first subsignal;

delay means for delaying the signal from said first distributor by said first predetermined time period;

a second distributor for distributing the signal from said first delay means;

output means for applying the signal from said second distributor as said first main signal; and second delay means for delaying the signal from said second distributor by said first predetermined time period and applying the delayed signal as said second subsignal.

10. A variable group delay equalizer in accordance with claim 2, wherein said second signal withdrawing means comprises a first distributor for distributing a synthesized signal received from said second synthesizing means;

outputting means for applying the signal from said first distributor as said third subsignal;

first delay means for delaying the signal from said first distributor by said second predetermined time period;

a second distributor for distributing the signal from said first delay means;

outputting means for outputting the signal from said second distributor as said second main signal; and a second delay means for delaying the signal from said second distributor by said second predetermined time period and applying the delayed signal as said fourth subsignal.

11. A variable group delay equalizer in accordance with claim 2, wherein said first signal withdrawing means withdraws a plurality of pairs of subsignals, each pair of subsignals being of time leading and time lag of an integer number of times of said first predetermined time period with respect to said first main signal, and said first synthesizing means includes preparatory adders each provided in each of said plurality of pairs and inverting a polarity of one of each pair of subsignals for synthesizing the polarity-inverted subsignal and the other subsignal of each pair, and a main adder for synthesizing the outputs from said preparatory adders.

12. A variable group delay equalizer in accordance with claim 2, wherein said second signal withdrawing means withdraws a plurality of pairs of subsignals, each pair of subsignals being of time leading and time lag of an integer number of times of said second predetermined time period with respect to said second main signal, respectively, and said third synthesizing means includes preparatory adders each provided in each of said plurality of pairs for synthesizing each pair of subsignals, and a main adder for synthesizing the outputs from said preparatory adders.

13. A variable group delay equalizer in accordance with claim 1, wherein
said delay means is structured in a plurality of stages, and
a single stage of said amplitude correcting means is provided for said plurality of said stages of delay means.

14. A variable group delay equalizer in accordance with claim 1 which comprises a plurality of pairs of said delay means and said amplitude correcting means, each pair being connected in cascade to each other.

15. A variable group delay equalizer in accordance with claim 1, which further comprises
a fixed group delay equalizer disposed between said signal inputting means and said delay means for applying a fixed group delay frequency response characteristic to said input signal.

16. A variable group delay equalizer in accordance with claim 15, wherein
said fixed group delay equalizer comprises
a fixed delay means for applying a fixed group delay frequency response characteristic to the input signal from said signal inputting portion, the signal of a fixed group delay frequency response characteristic from said fixed delay means having a fixed amplitude distortion caused during provision of the characteristic; and
a fixed amplitude correcting means receiving said fixed group delay frequency response characteristic signal for correcting said fixed amplitude distortion included therein, said fixed amplitude correction is made so that the amplitude of said fixed group delay frequency response characteristic signal is varied to become an amplitude opposite to the distortion.

17. A variable group delay equalizer in accordance with claim 16, wherein
said fixed group delay means comprises
first signal withdrawing means for distributing and delaying the received signal for withdrawing a first main signal and at least one pair of subsignals, said one pair of subsignals comprising a first subsignal which is of time leading of a first predetermined time period with respect to said first main signal and second subsignal which is of time lag of said first predetermined time period with respect to said first main signal;
first synthesizing means inverting a polarity of one of said pair of subsignals for synthesizing the polarity-inverted subsignal and the other of said pair of subsignals;
second synthesizing means for synthesizing the synthesized signal from said first synthesizing means and said first main signal; and
said fixed amplitude correcting means comprises
second signal withdrawing means receiving a synthesized signal from said second synthesizing means and distributing and delaying the synthesized signal for withdrawing a second main signal and at least one pair of subsignals, said pair of subsignals comprising a third subsignal which is of time leading of a second predetermined time period with respect to second main signal and a fourth subsignal which is of time delay of said second predetermined time period with respect to said second main signal;
third synthesizing means for synthesizing said third subsignal and said fourth subsignal; and
fourth synthesizing means for synthesizing the signal from said third synthesizing means and said second main signal.

18. A variable group delay equalizer in accordance with claim 15, wherein
said fixed group delay equalizer including selecting means for selecting either said fixed group delay frequency response characteristic or a flat characteristic to be applied to said input signal.

19. A variable group delay equalizer in accordance with claim 17 which further comprises
an attenuation setting circuit connected between said first synthesizing means and said second synthesizing means for setting an attenuation amount of the synthesized signal from said first synthesizing means, the attenuation setting circuit having a constant coefficient, and
a fixed attenuator connected between said third synthesizing means and said fourth synthesizing means for providing a fixed attenuation to the synthesized signal from said third synthesizing means,
said constant coefficient and said fixed attenuation are selected to obtain the desired fixed group delay frequency response characteristic.

20. A variable group delay equalizer in accordance with claim 19, wherein
said attenuation setting circuit is adapted such that one of three coefficients can be selected, the three coefficients being 0 and two constant values which are selected such that the phase of the output signal of said fixed group delay equalizer is opposite to each other, and
which further comprises interrupting means operable in response to selection of said coefficient 0 for interrupting the path of said third and fourth subsignals.

21. A variable group delay equalizer in accordance with claim 15, wherein
said fixed group delay equalizer comprises
signal withdrawing means for distributing and delaying the input signal from said signal inputting portion for withdrawing a main signal and two pairs of subsignals, one pair of subsignals out of said two pairs comprising first and second subsignals which are of time leading and time lag of a first predetermined time period with respect to said main signal, respectively, and the other pair of subsignals comprising third and fourth subsignals which are of time leading and time lag of second predetermined time period with respect to said main signal, respectively;
first synthesizing means inverting a polarity of one of said first and second subsignals for synthesizing the polarity-inverted subsignal and the other of said first and second subsignals;
second synthesizing means for synthesizing said third and fourth subsignals;
first fixed attenuator for applying a fixed attenuation to the synthesized signal from said second synthesizing means;
third synthesizing means for synthesizing the synthesized signal from said first synthesizing means and the attenuated signal from said first fixed attenuator;
second fixed attenuator for applying a fixed attenuation to the synthesized signal from said third synthesizing means;

fourth synthesizing means for synthesizing said main signal and the attenuated signal from said second fixed attenuator;

the attenuation characteristics of said first and second fixed attenuators being selected to obtain a desired fixed group delay frequency response characteristic.

22. A varaible group delay equalizer in according with claim 21, which further comprises:

interrupting means for selecting between a fixed group delay frequency reponse characteristic and a flat characteristic, said interrupting means operable for interrupting signal paths of said first through fourth subsignals.

23. A variable group delay equalizer as recited in claim 1 wherein:

said amplituee correcting means further includes selecting means for selecting between a correction characteristic provided thereby and a flat characteristic for said input signal, said selecting means including a combining means for combining said input signal, provided thereto over a main signal path, with at least one subsignal having a predetermined time displacement relative to said main signal and provided thereto over a subsignal path, thereby providing the correction characteristic to said input signal, said selecting means further including disconnecting means for selectively disconnecting the subsignal path from said combining means while maintaining the main signal path to said combining means thereby to provide a flat characteristic for said input signal.

24. A switching type of equalizer capable of selecting one of a predetermined characteristic and a flat characteristic, comprising:

a distributor for distributing a received signal;

a main signal path connected to said distributor for transmitting a main signal;

a subsignal path connected to said distributor for transmitting at least one pair of subsignals, said one pair of subsignals being of time leading and time delay of predetermined time period with respect to said main signal, respectively;

an adder for synthesizing said main signal and said subsignals; and interrupting means for interrupting said subsignal path, said interrupting means including switched means for selecting between said predetermined characteristic and said flat characteristic by selectively switching said subsignal in and out of connection between said distributor and said adder.

25. A switching type of equalizer capable of selecting one of a predetermined characteristic and a flat characteristic, comprising:

a distributor for distributing a received signal;

a main signal path connected to said distributor for transmitting a main signal;

a subsignal path connected to said distributor for transmitting at least one pair of subsignals, said one pair of subsignals being of time leading and time delay of predetermined time period with respect to said main signal, respectively;

an adder means for combining said main signal and said subsignals; and interrupting means for providing said flat or predetermined characteristic by interrupting only said subsignal path, including disconnect means for disconnecting said subsignal path from said adder means while maintaining said main signal path without interruption or variation of the main signal path to the adder means.

* * * * *